(12) United States Patent
Otto

(10) Patent No.: US 8,464,605 B2
(45) Date of Patent: Jun. 18, 2013

(54) ACTUATING DEVICE FOR A PARKING BRAKE OF A MOTOR VEHICLE

(75) Inventor: Martin Otto, Hannover (DE)

(73) Assignee: Ford Global Technologies, LLC, Dearborn, MI (US)

(*) Notice: Subject to any disclaimer, the term of this patent is extended or adjusted under 35 U.S.C. 154(b) by 1308 days.

(21) Appl. No.: 11/679,255

(22) Filed: Feb. 27, 2007

(65) Prior Publication Data
US 2007/0209469 A1    Sep. 13, 2007

(30) Foreign Application Priority Data

Feb. 28, 2006   (EP) .................................... 06110486

(51) Int. Cl.
*G05G 1/04*   (2006.01)

(52) U.S. Cl.
USPC .......................................................... 74/523

(58) Field of Classification Search
USPC ................. 74/491, 520, 523, 524, 525, 526
See application file for complete search history.

(56) References Cited

U.S. PATENT DOCUMENTS

| 2,274,133 | A | * | 2/1942 | Fergueson ...................... 74/541 |
| 2,632,338 | A | * | 3/1953 | Sandberg ........................ 74/503 |
| 2,716,902 | A | * | 9/1955 | Skareen .......................... 74/541 |
| 4,240,307 | A | * | 12/1980 | Yamazaki et al. .............. 74/503 |
| 4,353,265 | A | * | 10/1982 | Lipshield ...................... 74/502.4 |
| 4,856,363 | A | * | 8/1989 | LaRocca et al. ................ 74/535 |
| 5,065,643 | A | * | 11/1991 | Axtell .......................... 74/501.6 |
| 5,303,609 | A | * | 4/1994 | Iwanaga et al. ................. 74/523 |
| 2008/0110709 | A1 | * | 5/2008 | Vidal Ferrer et al. ......... 188/265 |

* cited by examiner

*Primary Examiner* — Vicky Johnson
(74) *Attorney, Agent, or Firm* — Joseph E. Root

(57) ABSTRACT

The invention relates to an actuating device for a parking brake of a motor vehicle, with at least one lever which is operatively connected to the parking brake via traction means and which is mounted such that it can pivot between a rest position and a brake application position about a first pivot axis which is positionally fixed with respect to the vehicle body. A rod is coupled to the lever such that it can pivot about a second pivot axis which is moveable with respect to the vehicle body and is parallel to the first pivot axis, the rod bearing a handle element and being mounted on the vehicle body such that it can pivot about a third pivot axis, which is positionally fixed with respect to the vehicle body, and such that it can be displaced along its longitudinal direction.

9 Claims, 4 Drawing Sheets

ACTUATING DEVICE FOR A PARKING
BRAKE OF A MOTOR VEHICLE

FIELD OF THE INVENTION

The present invention relates to an actuating device for a parking brake of a motor vehicle.

BACKGROUND

Actuating devices of the generic type, as are known, for example, from DE 195 21 159 A1 or DE 692 18 360 T2, comprise a handbrake lever which is mounted pivotably in a bearing mount and, in order to actuate the parking brake of the motor vehicle, is pivoted from a (low) rest position into a (high) brake application position in which the handbrake lever can be fixed by means of a fixing device comprising a locking segment and a pawl which is moveable via an actuating rod.

In the case of devices of this type, the handbrake lever serving to apply the handbrake is typically fitted in the region of the center console where it has a not inconsiderable extent in the longitudinal direction of the vehicle. However, in modern vehicles, such as, for example vans, it is increasingly endeavored to use the space even between the vehicle seats as far as the center console, with the intention possibly even being to permit this region to be walked on.

It is therefore an object of the present invention to provide an actuating device for a parking brake of a motor vehicle, which actuating device, while being highly convenient to operate, requires less space, in particular in the longitudinal direction of the vehicle.

SUMMARY OF THE INVENTION

According to the present invention, an actuating device for a parking brake of a motor vehicle, with at least one lever which is operatively connected to the parking brake via traction means is mounted such that it can pivot between a rest position and a brake application position about a first pivot axis which is positionally fixed with respect to the motor vehicle body. According to the invention, a rod is coupled to the at least one lever such that it can pivot about a second pivot axis which is moveable with respect to the vehicle body and is essentially parallel to the first pivot axis. The rod comprises a handle element. The rod is further mounted on the vehicle body such that it can pivot about a third pivot axis, which is positionally fixed with respect to the vehicle body, and such that it can be displaced along its longitudinal direction.

According to one embodiment of the invention, an apparatus is provided in which the actuation of the at least one lever which is operatively connected to the parking brake via traction means does not take place directly (i.e. by direction action on this lever), but rather indirectly, via a rod construction mounted in a pivotable and longitudinally displaceable manner at the same time. In this embodiment, the pivoting movement of the lever between its rest position and its brake application position, which is required in order to apply or release the parking brake, therefore takes place via a lever apparatus which deflects the force to be applied by the driver in such a manner that the driver can guide the handle element with a largely linear, at least predominantly vertically upwardly directed movement. In this case, the entire arrangement of the elements essential according to the invention, i.e. in particular the rod(s) coupled to the at least one lever, can be designed to be substantially more compact with respect to its extension in the longitudinal direction of the vehicle in comparison, for example, to a prior art handbrake lever which is actuated directly to apply or release the parking brake. In particular, a particularly space-saving accommodation of the at least one lever is made possible, with the result that the latter can be accommodated, for example, at least partially in the region below the gearshift lever. The space saved in the region of the center console can consequently be used in another way, for example, in particular in a van, in order to provide an intermediate passage which can be walked on. In addition, in the case of the actuating device according to the invention, a relatively large clearance remains in the region above the first pivot axis and can be used for further elements in the center console, such as, for example, cup holder depressions.

A further advantage of the arrangement according to the invention resides in a lever action which is particularly advantageously adapted to the special requirements for applying the parking brake: during the pivoting movement of the lever from its rest position into the brake application position, in the arrangement according to the invention the effective lever length of the torque which can be transmitted by means of the lever to its (first) pivot axis increases continuously, so that, during the last phase of this movement and with the same effort, a greater torque is exerted on this pivot axis and therefore a greater tensile force is exerted on the traction means (e.g. wire pull) which is preferably fastened in the region of this axis. This is particularly advantageous insofar as, during the last phase of the brake application operation, a greater force is generally required for entry into the brake application position, and, according to the invention, this greater force is provided to a certain extent automatically via the increase of the effective lever length and without increased effort by the driver.

According to a one embodiment, a first and a second lever are provided to which a respective first and second rod are coupled such that they can pivot about the second pivot axis, which is moveable with respect to the vehicle body and is parallel to the first pivot axis. The first and the second rods are mounted on the vehicle body such that they can pivot about the third pivot axis, which is positionally fixed with respect to the vehicle body, and such that they can be displaced along its longitudinal direction. In this case, the first and the second rod can be connected rigidly to each other preferably in an arrangement parallel to each other via the handle element. The effect achieved by this configuration is, firstly, increased stability of the arrangement in particular in relation to transverse forces, and at the same time particularly simple handling, since the handle element can be grasped particularly easily for actuation by the driver and pulled upward.

According to a another embodiment, the rod(s) is or are in each case mounted in a (plastic) sliding bearing which is coupled to the vehicle body such that it can pivot about the third pivot axis (III), which is positionally fixed with respect to the vehicle body. The use of a pivotably mounted sliding bearing minimizes the frictional forces in the actuating device with simultaneous play-free guidance of the rods, as a result of which parking brakes can also be realized for relatively heavy vehicles (such as, for example, vans) with ergonomically justifiable actuating forces via relatively short actuating travels.

According to yet another embodiment, a sliding bearing is coupled pivotably in each case to a support arm which is positionally fixed with respect to the vehicle body and extends essentially into the region of the first pivot axis, thus achieving a particularly stable arrangement. The first and the second lever are furthermore connected rigidly to each other preferably in an arrangement parallel to each other, thus further increasing the stability of the arrangement.

According to a final embodiment, the rod(s) is or are mounted on the respective lever and on the vehicle body in such a manner that the angle between the respective rod and the lever coupled to the latter is not more than 90° over the entire pivoting travel of the respective lever from the rest position to the brake application position. This permits ergonomically particularly favorable handling insofar as the movement of the handle element with its component pointing in the longitudinal direction of the vehicle only takes place forward in the direction of travel (i.e. toward the driver) over the entire pivoting travel of the levers from the rest position to the brake application position and, for example, an ergonomically unfavorable pivoting movement pointing away from the driver ("S twist") is avoided.

Further refinements of the invention can be gathered from the description and the subclaims.

BRIEF DESCRIPTION OF THE DRAWINGS

The invention is explained below using preferred embodiments and with reference to the attached figures, in which.

DETAILED DESCRIPTION OF THE PREFERRED EMBODIMENTS

Figure 1:
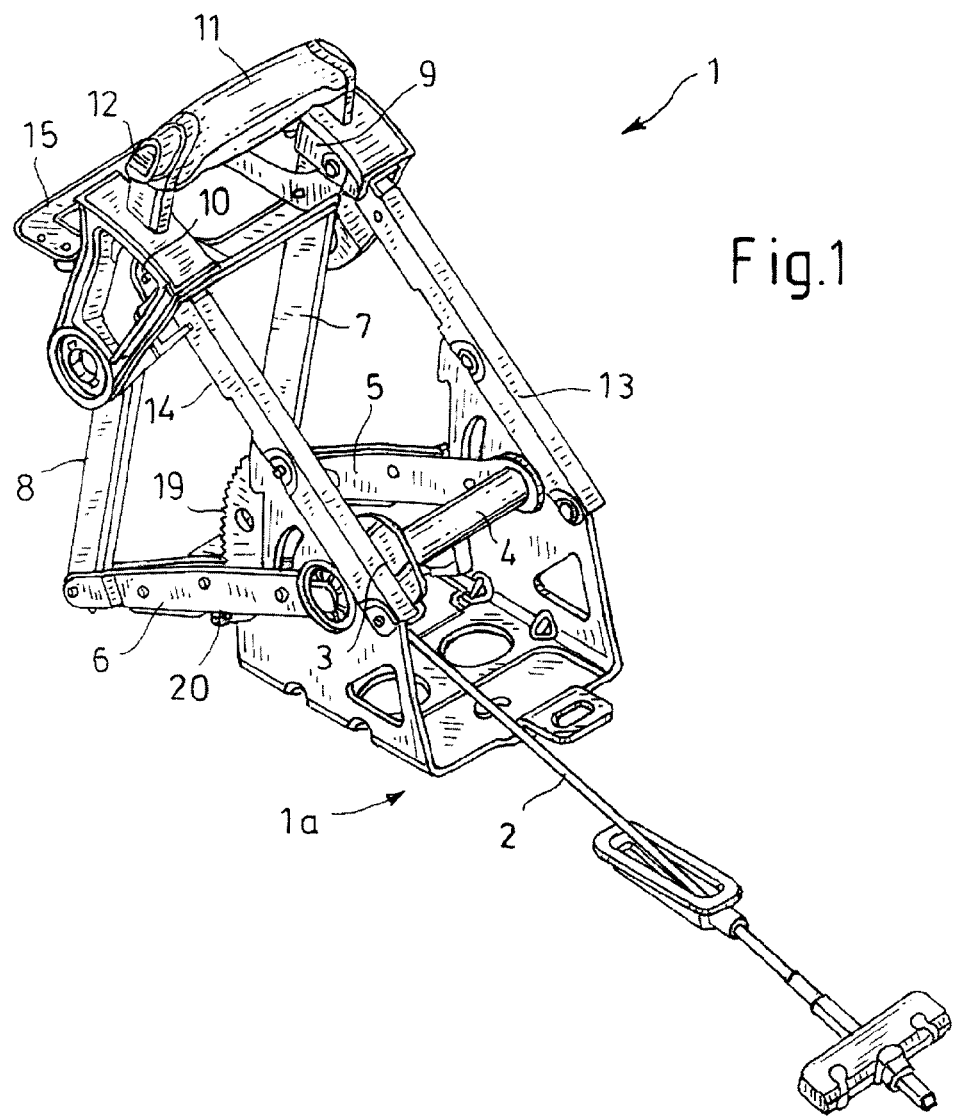
FIGS. 1 and 2 show perspective views of an actuating device 1 according to the invention for a parking brake of a motor vehicle, in each case in the released state.

FIGS. 1 to 4 show different perspective views of an actuating device 1 according to the invention for a parking brake of a motor vehicle. According to FIGS. 1-3, the actuating device 1 serves to apply a mechanical tensile stress to, or releases a mechanical tensile stress from, a wire pull 2 which, in a manner known per se, transmits this tensile stress via a distributor to further wire pulls for applying or releasing two or more separate components of the parking brake of the motor vehicle. For this purpose, the wire pull 2 is guided in a likewise known manner via a roller element 3, which is fastened to a spindle 4, such that the wire pull 2 can be subjected to a tensile stress by means of rotation of the spindle 4. For this purpose, the spindle 4 is mounted pivotably on vehicle body 1a and is connected fixedly in its two end sections to a respective lever 5, 6, these two levers 5, 6, for their part, being connected rigidly to each other in an arrangement parallel to each other via a further transverse rod 17 and therefore being jointly pivotable between stops on the vehicle body 1a about a positionally fixed, first pivot axis which runs along the spindle 4 and is denoted by "I".

Each of the two levers 5, 6 bears, at its longitudinal end opposite the first pivot axis I or the spindle 4, a respective rod 7 or 8 which is coupled pivotably (via a respective joint 5a, 6a) and with an essentially rectangular cross section in each case, the two rods 7 and 8, for their part, being connected rigidly to each other likewise in an arrangement parallel to each other via a handle element 11 and therefore being jointly pivotable about a second pivot axis II which runs parallel to the spindle 4 and therefore to the first pivot axis I but is moveable as a result of the pivotability of the levers 5, 6.

Figure 2:
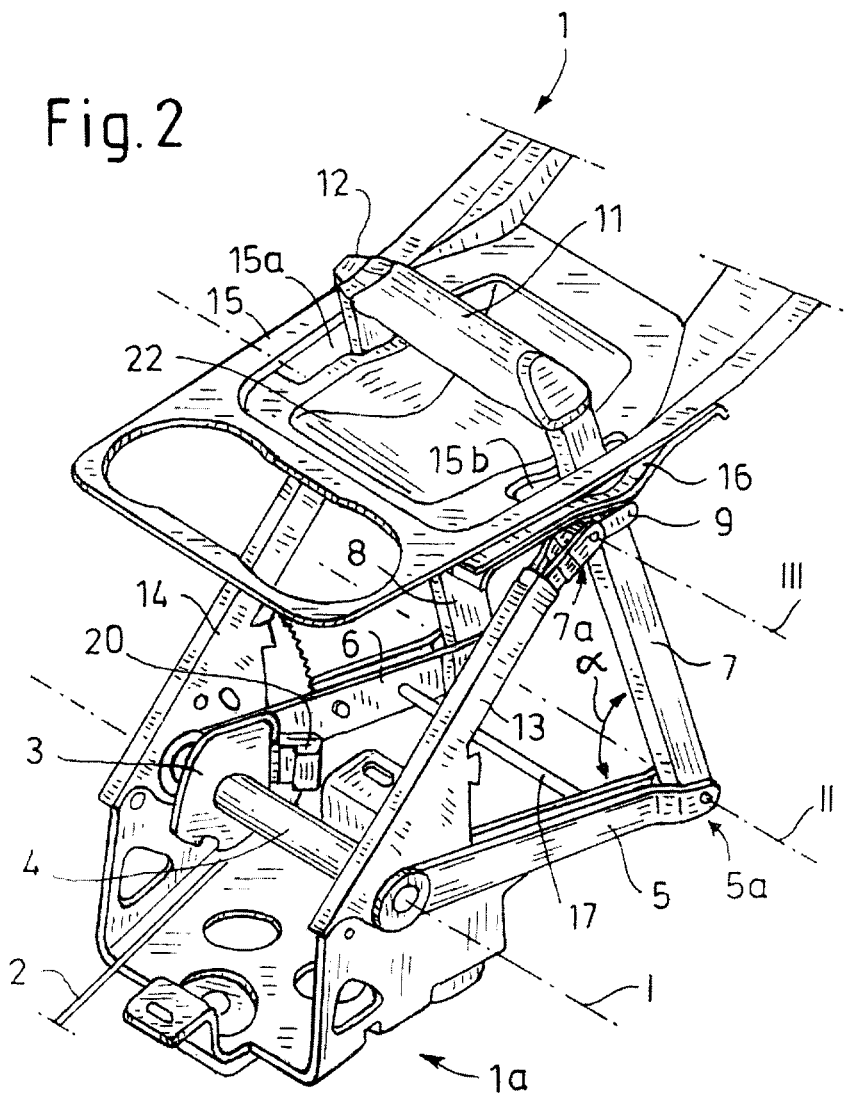

As can best be seen from FIG. 2, the rods 7, 8 are guided displaceably in the longitudinal direction of the rods 7, 8 in each case in a sliding bearing 9 or 10, the sliding bearings 9, 10, for their part, being coupled pivotably (via a respective joint 7a, 8a) to a respective support 13 or 14 which is on the body 1a and which, according to the exemplary embodiment, at the same time accommodates the spindle 4, with the result that the sliding bearings 9, 10 and therefore the rods 7, 8 accommodated by them are pivotable about a third pivot axis III which is positionally fixed with respect to the vehicle body 1a. This pivot axis III is defined by the end of the supports 13 and 14 and runs in the direct vicinity of the rods 7 and 8 on that side of the rods which faces the pivot axis I.

A covering element 15 on the console can likewise be seen in the figures. The rods 7, 8 extend upward through cutouts 15a, 15b provided in the covering element 15, these cutouts 15a, 15b being covered by covering elements 16 (merely indicated in FIGS. 2 and 3), for example, in order to avoid dirt particles or the like dropping into them. Furthermore, a knob 12 is provided, according to FIG. 2, on the handle element 11 and by the pressing thereof a fixing device, which is configured in a manner known per se and comprises a locking segment 19 (which can be seen in FIG. 1) and a pawl arrangement 20 for fixing or releasing the lever arrangement can be locked or unlocked via a wire pull (not visible in the figures) guided in the handle element 11 and the rod 8 via deflecting rollers. The covering element 15 has a trough 22 in the central region which, in the released state of the parking brake, facilitates better grasping of the handle element 11 and also, on the other hand, can be used for the storage of smaller articles, such as coins or the like.

Figure 3:
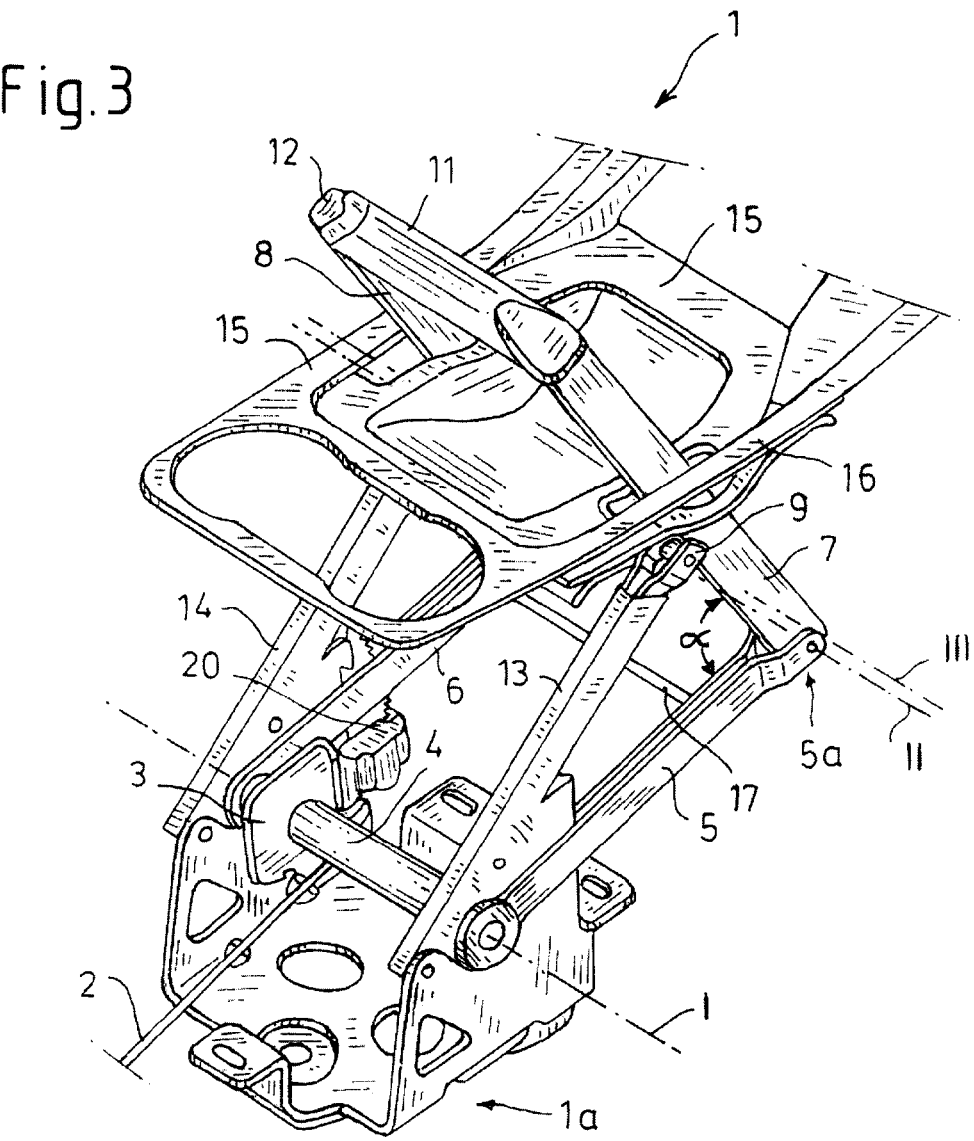
FIG. 3 shows a perspective view of the parking brake according to FIG. 2, but in an applied state.

In order to actuate the parking brake(s), after actuation of the knob 12 on the handle element 11, the driver pulls the two rods 7, 8 and therefore the levers 5, 6 out of the rest position shown in FIG. 2 into the brake application position shown in FIG. 3, with the application of force exerted in this connection by the driver or the path described by the handle element 11 being directed predominantly vertically upward (and only with a comparatively small component for this purpose forward in the direction of travel), since the path described by the handle element 11 runs along a curve of a relatively large radius as a result of the mounting of the rods in the pivotable sliding bearings 9, 10.

In this case, according to a preferred embodiment, the rods 7, 8 are mounted on the respective levers 5, 6 and on the vehicle body 1a in such a manner that the angle (denoted by $\alpha$ in FIGS. 2 and 3) between the respective rods 7, 8 and the lever 5, 6 coupled thereto is not greater than 90° over the entire pivoting travel of the levers 5 and 6 from the rest position to the brake application position (i.e. in particular in the positions shown in FIGS. 2 and 3). In this case, an ergonomically unfavorable, approximate path of movement of the handle element 11 (S twist) is avoided, since the movement of the handle element 11 with its component pointing in the longitudinal direction of the vehicle only takes place forwards in the direction of travel (i.e. toward the driver) over the entire pivoting travel of the levers 5, 6 from the rest position to the brake application position, i.e. the center point of the circular arc section described over the actuating travel by the handle element 11 lies in front of the actuating device in the direction of travel.

The dimensions of the lever construction are selected in such a manner that, when the parking brake is applied, the angle $\alpha$ becomes bigger and tends toward 90° but does not reach this value. As a result, the transmission of force to the levers 5, 6 becomes increasingly more effective; i.e., as the parking brake is increasingly applied, the effective lever length of the levers 5 and 6 likewise increases, which constitutes a desired effect.

Figure 4:
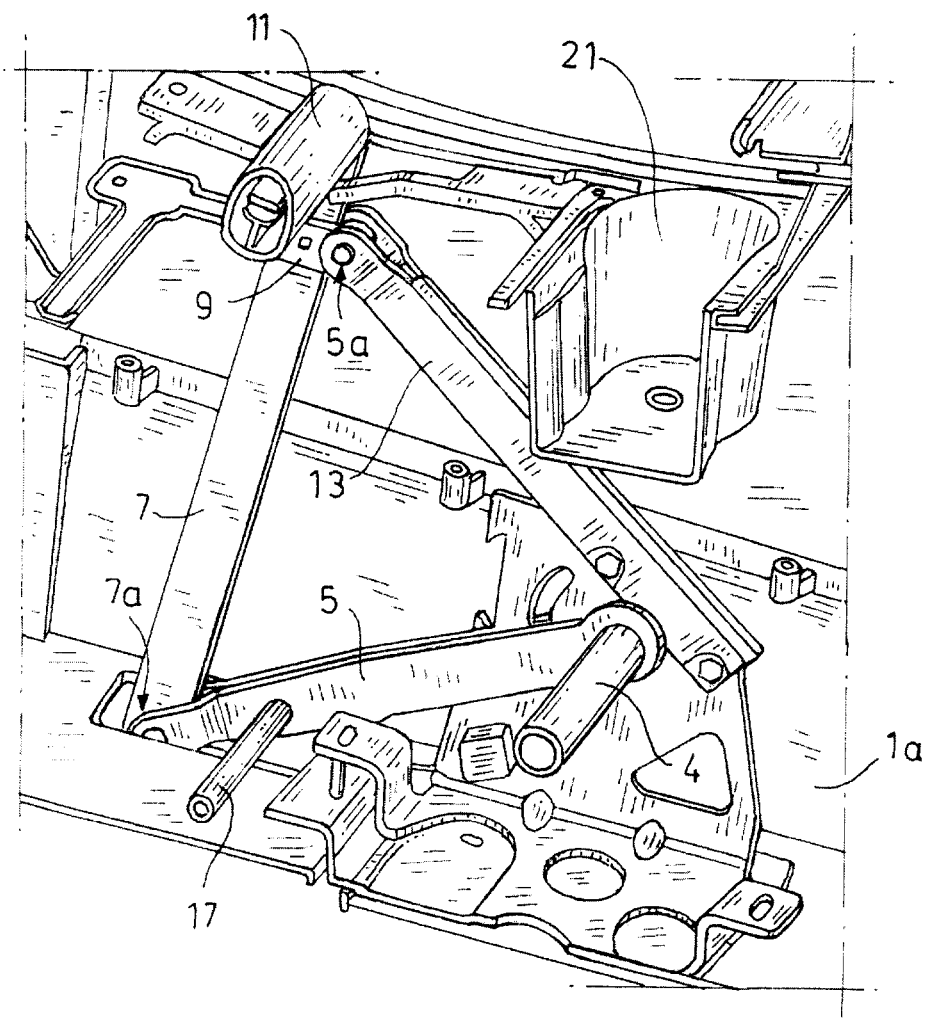
FIG. 4 shows a perspective view of the released parking brake in the fitted context.

The fitted situation of an actuating device according to the invention is illustrated in FIG. 4. The device can be integrated in the center console in the vicinity of the gearshift lever (not illustrated), with the clearances remaining between the two parallel levers, in the case of the device according to the invention, also permitting the arrangement of cup holder recesses 21 in the center console approximately above the pivot axis 4.

I claim:

1. An actuating device for parking brake of a motor vehicle, the motor vehicle having a vehicle body, the device comprises:
    a lever operatively connected to the parking brake, the lever being pivotable between a rest position and a brake application position about a first pivot axis which is positionally fixed with respect to the vehicle body; and
    a rod coupled to the lever, the rod being pivotable about:
        a second pivot axis which is movable with respect to the vehicle body and substantially parallel to the first pivot axis; and
        a third pivot axis which is positionally fixed with respect to the vehicle body, such that the rod can be displaced along its longitudinal direction, wherein, the longitudinal direction is parallel to a plane constituted by the second and the third pivot axis; and
    a handle element directly attached to the rod;
    wherein the rod is mounted on the lever and on the vehicle body such that the angle between the rod and the lever coupled thereto is not more than 90° over the entire pivoting travel of the lever from the rest position to the brake application position.

2. The actuating device of claim 1, further comprising a second rod, wherein the first rod and the second rod are coupled such that they can pivot about the second pivot axis.

3. The actuating device of claim 2, wherein the first rod and the second rod are connected rigidly to each other in an arrangement parallel to each other.

4. The actuating device of claim 3, wherein the first rod and the second rod are connected rigidly to each other in an arrangement parallel to each other via the handle element.

5. The actuating device of claim 1, wherein the rod is longitudinally movable in a sliding bearing which is coupled to the vehicle body.

6. The actuating device of claim 5, wherein the sliding bearing is coupled pivotably to a support arm which is positionally fixed with respect to the vehicle body and extends into the region of the first pivot axis.

7. The actuating device of claim 1, wherein the handle element moves in a substantially circular arc over the entire pivoting travel of the lever from the rest position to the brake application position.

8. An actuating device for parking brake of a motor vehicle, the motor vehicle having a vehicle body, the device comprising:
    a lever operatively connected to the parking brake, the lever being pivotable between a rest position and a brake application position about a first pivot axis which is positionally fixed with respect to the vehicle body; and
    a rod, coupled to the lever and movable through a sliding bearing coupled to the vehicle body, wherein the rod is pivotable about:
        a second pivot axis which is movable with respect to the vehicle body and substantially parallel to the first pivot axis; and
        a third pivot axis which is positionally fixed with respect to the vehicle body such that the rod can be displaced along its longitudinal direction, longitudinal direction is parallel to a plane constituted by the second and the third pivot axis; and
    a handle element directly attached to the rod;
    wherein the rod is mounted on the lever and on the vehicle body such that the angle between the rod and the lever coupled thereto is not more than 90° over the entire pivoting travel of the lever from the rest position to the brake application position.

9. The actuating device of claim 8, wherein the sliding bearing is coupled pivotably to a support arm which is positionally fixed with respect to the vehicle body and extends into the region of the first pivot axis.

* * * * *